United States Patent
Ibach et al.

(10) Patent No.: US 10,979,139 B1
(45) Date of Patent: Apr. 13, 2021

(54) OPTICAL PROTECTION DEVICES HAVING PASSIVE SPLITTER/COUPLERS AND BUILT-IN INTERRUPTERS

(71) Applicant: Ciena Corporation, Hanover, MD (US)

(72) Inventors: Trevor John Ibach, Manotick (CA); Larry Babineau, Ottawa (CA); Eric Maniloff, Stittsville (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/835,378

(22) Filed: Mar. 31, 2020

(51) Int. Cl.
*H04B 10/032* (2013.01)
*G02B 6/293* (2006.01)
*G02B 6/35* (2006.01)

(52) U.S. Cl.
CPC ....... *H04B 10/032* (2013.01); *G02B 6/29379* (2013.01); *G02B 6/3588* (2013.01); *G02B 6/3594* (2013.01)

(58) Field of Classification Search
CPC .. H04B 10/032; G02B 6/3588; G02B 6/3594; G02B 6/29379; G02B 6/09
See application file for complete search history.

(56) References Cited

U.S. PATENT DOCUMENTS

| | | | | |
|---|---|---|---|---|
| 4,859,807 A * | 8/1989 | Swiggett | ................ | H05K 3/103 174/259 |
| 5,191,626 A * | 3/1993 | Stern | ...................... | H04B 10/27 385/24 |
| 5,778,117 A * | 7/1998 | Inoue | ................... | H04B 10/071 372/6 |
| 5,832,155 A * | 11/1998 | Rasch | ..................... | G02F 1/313 385/48 |
| 6,646,790 B2 | 11/2003 | Parry et al. | | |
| 6,842,561 B2 | 1/2005 | Mak et al. | | |
| 7,151,869 B2 * | 12/2006 | Fernando | ............. | G01N 21/255 385/16 |
| 7,315,681 B2 * | 1/2008 | Kewitsch | ............. | G02B 6/4457 385/135 |
| 7,433,603 B2 | 10/2008 | Johnson et al. | | |
| 7,467,056 B2 | 12/2008 | Maniloff et al. | | |
| 7,565,084 B1 * | 7/2009 | Wach | ................... | H04B 10/564 398/201 |
| 7,965,949 B1 * | 6/2011 | Wach | ................... | H04B 10/506 398/200 |
| 8,521,038 B1 * | 8/2013 | Wach | ...................... | H04J 14/04 398/200 |
| 9,065,572 B1 * | 6/2015 | Wach | ................... | H04B 10/506 |
| 9,088,380 B2 | 7/2015 | Ibach et al. | | |
| 9,143,227 B2 | 9/2015 | Moynihan et al. | | |
| 9,806,801 B2 | 10/2017 | Maniloff et al. | | |

(Continued)

*Primary Examiner* — Andrew Jordan
(74) *Attorney, Agent, or Firm* — Clements Bernard Walker; Lawrence A. Baratta, Jr.; Christopher L. Bernard (57) ABSTRACT

Optical protection devices are provided for protecting client equipment in an optical communication system. According to one implementation, a protection device includes a passive optical coupler configured to combine optical signals from a plurality of input paths, where the passive optical coupler is further configured to provide the output signals along an optical output path. The exemplary protection device further includes one or more interrupters configured to allow at most one input from a plurality of optical inputs via the plurality of input paths to be provided to the passive optical coupler at one time.

20 Claims, 8 Drawing Sheets

(56) References Cited

U.S. PATENT DOCUMENTS

| | | | |
|---|---|---|---|
| 9,918,148 | B2 | 3/2018 | Swinkels et al. |
| 10,097,262 | B2 | 10/2018 | Maniloff et al. |
| 10,333,614 | B2 | 6/2019 | Ibach et al. |
| 10,348,410 | B1 | 7/2019 | Charlton et al. |
| 10,396,891 | B2 | 8/2019 | Maniloff et al. |
| 10,852,497 | B2 * | 12/2020 | Maniloff .............. G02B 6/4296 |
| 2007/0036506 | A1 * | 2/2007 | Kewitsch ............. G02B 6/4457 |
| | | | 385/135 |
| 2016/0119075 | A1 | 4/2016 | Gareau et al. |
| 2019/0097719 | A1 | 3/2019 | Chedore et al. |
| 2020/0271877 | A1 * | 8/2020 | Maniloff .............. G02B 6/4278 |
| 2020/0271878 | A1 * | 8/2020 | Maniloff .............. G02B 6/3879 |

* cited by examiner

| Control 1 | | Control 2 | | Interrupter State | Reported Status 1 | Interrupter State |
|---|---|---|---|---|---|---|
| State | Ownership | Closed | Ownership | | | |
| Neutral | Neutral | Neutral | Neutral | Latest state | Latest status 1 | Latest status 2 |
| Closed | Master | Neutral | Slave | Source 2 open | Closed | Open |
| Neutral | Slave | Closed | Master | Source 2 open | Open | Closed |
| Closed | Master | Closed | Slave | Source 2 open | Closed | Open |
| Closed | Slave | Closed | Master | Source 1 open | Open | Closed |

OPTICAL PROTECTION DEVICES HAVING PASSIVE SPLITTER/COUPLERS AND BUILT-IN INTERRUPTERS

TECHNICAL FIELD

The present disclosure generally relates to optical networks. More particularly, the present disclosure relates to systems and methods for protecting optical equipment using optical interrupters incorporated into optical switching devices having passive optical couplers.

BACKGROUND

Generally, solutions have been proposed for protection of passive optical devices using protection engines and communications between transceivers (as described herein transceivers are optical transmitters and optical receivers for bi-directional communication, and other terms may include, without limitation, transponders, optical modules, modems, etc.) to control their laser states, triggering a protection switch. This requires a communications mechanism between the transceivers, and fast laser controls on the modules associated with the transceivers. Equipment with built in optical switches (as opposed to optical couplers) can have inputs from the transceivers to perform the switch. This still requires fast laser-off capabilities, but does not require fast laser-on capabilities or coordination between transceivers. Some systems for transporting packets may be configured with some of this functionality, but not all of it.

The conventional solutions suffer from various shortcomings. For example, pluggable transceivers operating at 40 Gb/s or faster (e.g., QSFP+, QSFP28, QSFP-DD, etc.) and having only Inter-Integrated Circuit (I2C) based laser-off/laser-on controls will typically be significantly slower, resulting in longer protection switch times. These transceivers are typically multi-lane interfaces that require control for each laser individually, usually in serial fashion, which increases the laser-on/laser-off time. The standards of the Multi-Source Agreements (MSA), for instance, specifies only 100 ms for laser-off and 400 ms for laser-on. Sub-50 ms switch times typically require 10 ms laser-off/laser-on times.

Another shortcoming is that coordination of activity between transponder equipment requires direct communication paths between them. A direct communication path typically requires co-located equipment and may also dictate specific slot assignments within a chassis. Also, coordination of activity between transponder equipment in conventional systems may also require additional processing time on each transponder, as well as latency for status/control communications between the transponder.

Additionally, some systems for transporting packets may operate in mated configurations where a single Optical Transport Unit (OTU) (e.g., an Optical Transport Unit C level n (OTUCn)) line consists of optical ports on multiple adjacent circuit packs, which would require four or more of these circuit packs for protected configurations. A direct communications path between all implicated equipment can be difficult to accomplish because of how inter-card communications are done.

Conventional systems may have other issues. For example, circuit packs (modules) across multiple shelves cannot support protected configurations because they are unable to communicate with each other. Optical switches may be able overcome the problem of modules not being able to communicate with each other. However, since optical switches are larger and more expensive than passive devices, they are usually not as widespread as passive devices. In addition, pluggable transceivers operating at higher rates are usually multi-lane interfaces, which require turning off each lane (laser) individually via an I2C interface, which is too slow and results in protection switch times exceeding 50 ms.

Also, many pluggable transceivers of conventional systems do not have a high enough link budget (margin) to operate with subtending optical switch equipment which introduces loss. Multi-lane interfaces typically do not, but there are also single-lane interfaces that do not as well. Some passive optical switch devices may require several dB of link budget. This problem is even worse when the optical switches are used back to back in cascaded applications.

Therefore, there is a need in the field of optical networks to provide protection for optical network devices while overcoming the above-noted deficiencies in conventional systems.

BRIEF SUMMARY

The present disclosure describes optical protection devices for protecting client equipment. In one embodiment, a protection device comprises a passive optical coupler configured to combine optical signals from a plurality of input paths and further configured to provide the output signals along an optical output path. The protection device also includes one or more interrupters configured to allow at most one input from a plurality of optical inputs via the plurality of input paths to be provided to the passive optical coupler at one time.

According to another embodiment, an optical switching device includes a plurality of optical input paths configured for receiving optical signals via an optical network. The optical switching device also includes a passive optical coupler configured to combine optical signals from the plurality of optical input paths and further configured to provide the output signals along an optical output path. Also, the optical switching device includes one or more interrupters configured to allow at most one input from the plurality of optical input paths to be provided to the passive optical coupler at one time.

According to yet another embodiment, a non-transitory computer-readable medium configured to store computer logic having instructions is described. The instructions, when executed, cause one or more processing devices to control one or more interrupters of an optical switching device to block optical signals to a passive optical coupler via a primary input path from a first optical source. Subsequent to blocking the optical signals via the primary input path, the instructions further cause the one or more processing devices to control the one or more interrupters of the optical switching device to allow optical signals to pass to the passive optical coupler via a second input path from a second optical source. Optical signals from at most one input path are provided to the passive optical coupler at one time.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Again, the present disclosure relates to systems and methods for protecting optical equipment using optical interrupters incorporated into optical switching devices having passive optical couplers. Instead of turning lasers on/off to trigger client-side optical protection, the embodiments of the present disclosure may use built-in interrupters on the optical protection equipment to control the light, regardless of transceiver capabilities. This allows any transceivers to be used on the client ports, and the laser off/on capabilities of the transceiver will be irrelevant in this case. This permits cheaper devices to be able to be used, offering another way to lower the overall solution cost.

If a single interrupter is used in the optical switching devices, with controls from each transponder equipment, each instance of transponder equipment can control the interrupter independent of the other. Since no direct communication path is required before the transponder equipment, slot assignments may be independent (and thus flexible). If multiple interrupters are used, coordination across the coupler inputs may still be required. This logic may be able to be built into the optical coupler equipment, which could mean that no direct communication path is required between transponder equipment.

If a single interrupter is used, with controls from each transponder equipment, coordination between transponders is not required, resulting in less processing by each transponder, and lower traffic impacts due to the protection switch. If multiple interrupters are used but the coordination logic is performed within the optical coupler equipment, this may also result in less processing by each transponder, and lower traffic impacts due to the protection switch.

Overcoming the need for co-located equipment also allows protection of services across mated configurations where, for example, a single OTUCn line consists of optical ports on two adjacent circuit packs. Overcoming the need for co-located equipment also allows protection between circuit packs across different shelves, racks, floors, buildings, etc.

The protection systems and methods of the present disclosure may add value to passive optical coupler devices, which are cheaper than active optical switches. Also, the present embodiments are configured to interrupt the entire optical signal in one operation, so individual controls are not required for each lane within a multi-lane pluggable transceiver, which allows the 50 ms requirement for protection switch times to be met.

Adding an amplifier into the device allows amplification of the optical signal to increase the link budget, thus enabling virtually any pluggable transceiver to be used in these applications. SOAs are cheaper than normal optical amplifiers such as EDFAs, but they may introduce noise into the optical signal, which could impact a multi-span application. Since some embodiments may be point-to-point, the presence of more noise may not be an issue in this particular application.

Figure 1:
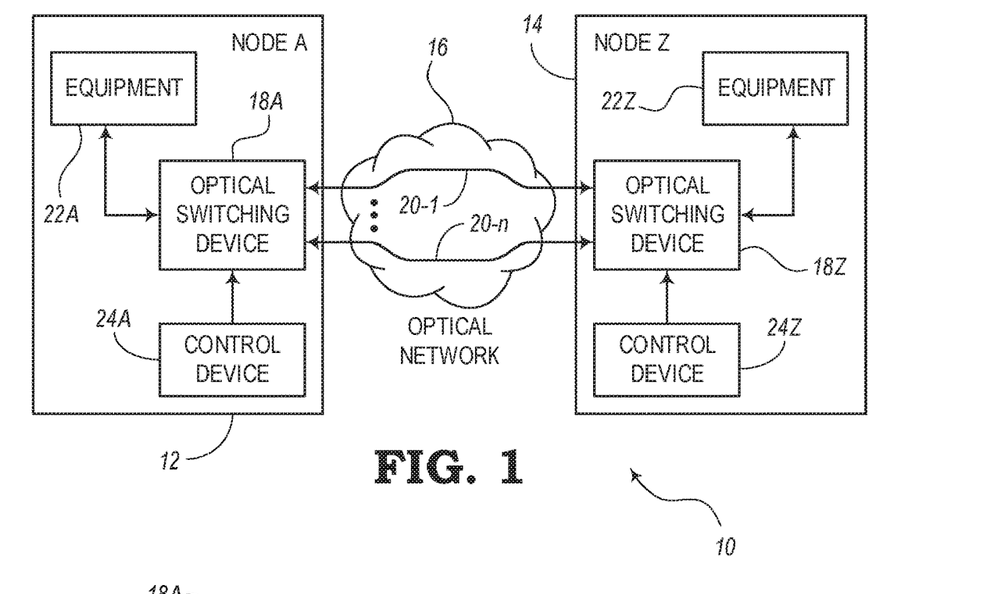
FIG. 1 is a block diagram illustrating an optical communication system, according to various embodiments of the present disclosure.

FIG. 1 is a block diagram illustrating an embodiment of an optical communication system 10. In this embodiment, the optical communication system 10 includes a first node 12 (Node A) and a second node 14 (Node Z) configured to communicate with each other over an optical network 16. In its simplified form, the first node 12 includes an optical switching device 18A, which is configured to communicate with an optical switching device 18Z of the second node 14 via the optical network 16. The optical switching devices 18A, 18Z may communicate over one or more optical paths 20-1, . . . , 20-n in the optical network 16. The optical switching device 18A of Node A may be configured to communicate signals with corresponding equipment 22A. Likewise, the optical switching device 18Z of Node Z may be configured to communicate signal with corresponding equipment 22Z. Although only two nodes (i.e., Nodes A and Z) are illustrated in FIG. 1, it should be understood by one of ordinary skill in the art that the optical communication system 10 may include any number of nodes in any suitable configuration for enabling communicate among the nodes over the optical network 16.

According to some embodiments, the optical switching device 18A of Node A may be controlled by a local control device 24A and the optical switching device 18Z of Node Z may be controlled by a local control device 24Z. In some embodiments, the control devices 24A, 24Z may be supplemented by a central controller that is configured to coordinate optical switching devices 18 throughout the optical communication system 10.

The optical communication system 10 provides client optical protection between the two nodes 12, 14. By providing multiple optical paths 20-1, . . . , 20-n in the optical network 16, the optical communication systems 10 allows full redundancy of client pluggable optical modules, transponder equipment, line modules, and optical paths and lines through the optical network 16, due to fiber cuts, equipment failures, and the like. The optical switching devices 18A, 18Z may provide a way for the subtending client equipment 22A, 22Z of the nodes 12, 14 to communicate externally of the nodes 12, 14. The optical switching devices 18A, 18Z may include optical splitters, couplers, combiners, switches, etc., to allow the equipment 22A, 22Z to provide traffic that is carried over the optical network 16.

Figure 2A:
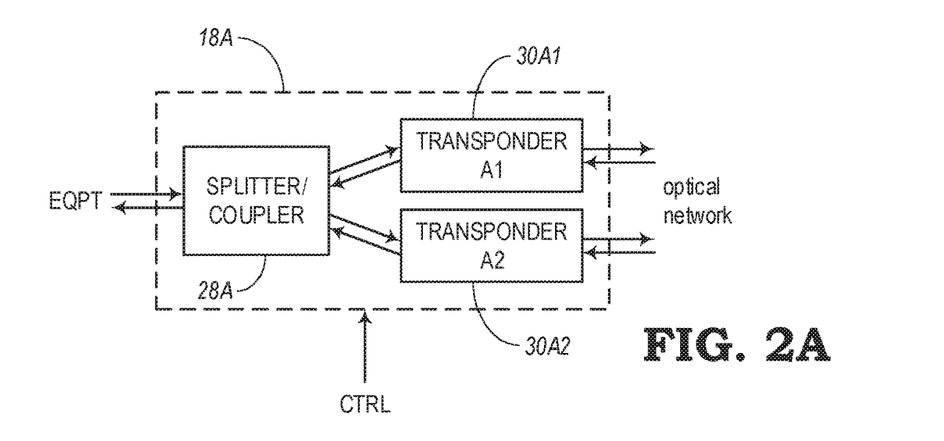
FIG. 2A is a block diagram illustrating the optical switching device of the first node of the optical communication system of FIG. 1, according to various embodiments.

FIG. 2A is a block diagram illustrating an embodiment of the optical switching device 18A of the first node 12 of the optical communication system 10 of FIG. 1. In this embodiment, the optical switching device 18A includes a splitter/coupler 28A, a first transponder 30A1, and a second transponder 30A2. The term "transponder" is used herein and those of ordinary skill in the art will recognize this can include a transceiver (transmitter/receiver), optical modem, etc. The splitter/coupler 28A, according to some embodiments, may include a passive optical device (e.g., a Y-cable) configured to passively split a single optical signal from a single optical path (e.g., from the equipment 22A) into multiple optical signals along multiple paths (e.g., to the transponders 30). The passive optical device (e.g., Y-cable) of the splitter/coupler 28A may be further configured to passively combine multiple optical signals from the multiple paths (e.g., from the transponders 30) into a single optical signal along the single optical path (e.g., to the equipment). That is, the term "Y-cable" is indicative of the geometry of the cable—two inputs/one output or one input/two outputs. In some embodiments, the splitter/coupler 28A may also include one or more interrupters, as described below, for providing protection to the passive optical components and equipment 22A. For example, the passive optical device (e.g., Y-cable) in the transmit direction (two inputs/one output) requires only one transponder to be active at a time.

According to other embodiments, the optical switching device 18A may include any number of transponders 30. The splitter/coupler 28A may be connected to the equipment 22A, shown in FIG. 1, to allow bi-directional communication therebetween. Also, the splitter/coupler 28A may be connected to each of the transponders 30A1, 30A2 to allow bi-directional communication therebetween. The transponders 30A1, 30A2 may be connected to one or more other nodes (e.g., Node Z) via the optical network 16 and can each communicate in a bi-directional manner.

The optical switching device 18A may be configured to receive a control signal (CTRL), which may be supplied by the control device 24A. The control signal may be configured to control aspects of the splitter/coupler 28A and/or one or more of the transponders 30A1, 30A2.

Figure 2B:
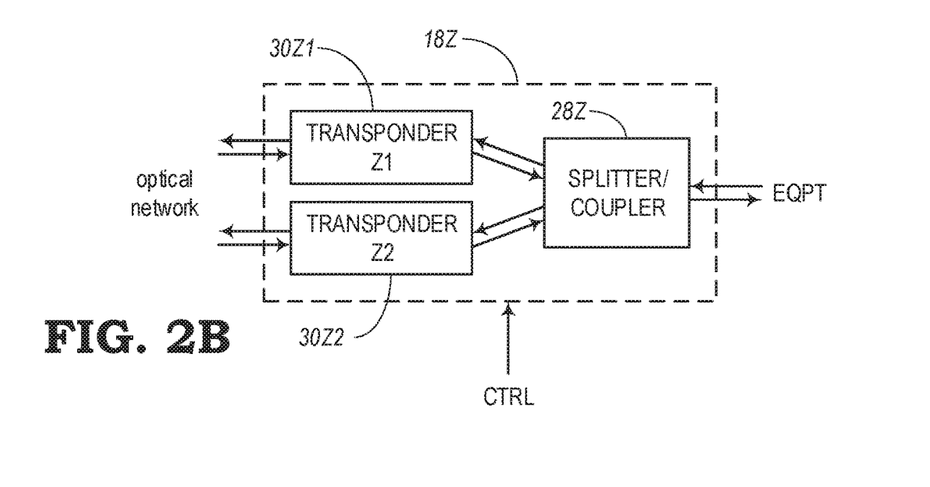
FIG. 2B is a block diagram illustrating the optical switching device of the second node of the optical communication system of FIG. 1, according to various embodiments.

FIG. 2B is a block diagram illustrating an embodiment of the optical switching device 18Z of the second node 14 of the optical communication system 10 of FIG. 1. Similar to the optical switching device 18A of FIG. 2A, the optical switching device 18Z of FIG. 2B, according to some embodiments, includes a splitter/coupler 28Z, a first transponder 30Z1, and a second transponder 30Z2. In other embodiments, the optical switching device 18Z may include any number of transponders 30.

The splitter/coupler 28Z may be connected to the equipment 22Z, shown in FIG. 1, to allow bi-directional communication therebetween. Also, the splitter/coupler 28Z may be connected to each of the transponders 30Z1, 30Z2 to allow bi-directional communication therebetween. The transponders 30Z1, 30Z2 may be connected to one or more other nodes (e.g., Node A) via the optical network 16 and can each communicate in a bi-direction manner.

The splitter/coupler 28Z, according to some embodiments, may include a passive optical device (e.g., Y-cable) configured to passively split a single optical signal from a single optical path into multiple optical signals along multiple paths and may be further configured to passively combine multiple optical signals from the multiple paths into a single optical signal along the single optical path. In some embodiments, the splitter/coupler 28Z may also include one or more interrupters, as described below, for providing protection to the passive optical components and equipment 22Z.

The optical switching device 18Z may be configured to receive a control signal (CTRL) from the control device 24Z. The control signal may be configured to control aspects of the splitter/coupler 28Z and/or one or more of the transponders 30Z1, 30Z2.

Referring again to FIG. 1, the network configuration of the optical communication system 10 uses client optical protection at both ends of the optical network 16. The optical switching devices 18A, 18Z at each end of the optical network 16 may include optical splitters/switches between a single instance of the equipment 22A, 22Z and a set of two or more transponders of the optical switching devices 18A, 18Z. The optical switching devices 18A, 18Z of the present disclosure may include passive optical protection mechanisms.

The protection mechanisms allow redundant paths (e.g., optical paths 20-1, . . . , 20-n) through the optical network 16 for path protection in the event that a primary optical path is lost, inoperable, or degraded. Also, the protection mechanisms of the present disclosure also include protection for the couplers or combiners of the optical switching devices 18A, 18Z by performing certain switching techniques, as described in the present disclosure. Not only can the optical switching devices 18A, 18Z providing switching in a time less than 50 ms, these switching techniques are intended to provide protection to the optical switching devices 18A, 18Z and equipment 22A, 22Z by preventing the simultaneous propagation of multiple optical signals on sensitive coupling or combining components within the client nodes.

The splitter/couplers 28A, 28Z may be Y-cables or other suitable passive optical components. In the present disclosure, the splitter/couplers 28A, 28Z protect client traffic using redundant protection paths, while also providing protection for client equipment from combining multiple optical signals, which may provide too much power to the equipment and causes colliding data signals to interfere with each other. Also, the splitter/couplers 28A, 28Z are configured to operate in a manner to switch from one path to another in under 50 ms.

Figure 3:
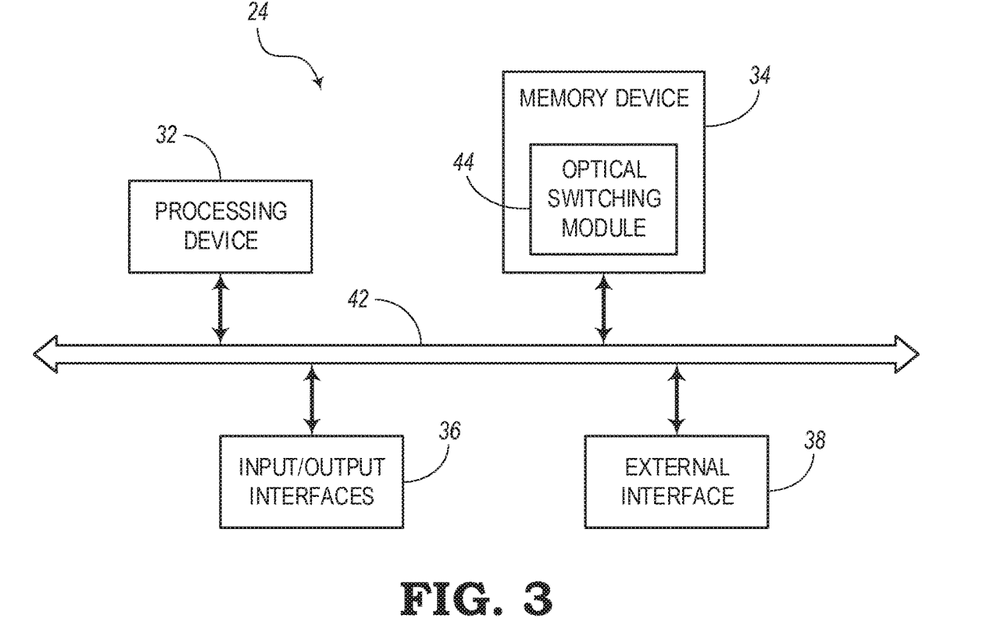
FIG. 3 is a block diagram illustrating the control device of one or more of the first or second node shown in FIG. 1, according to various embodiments.

FIG. 3 is a block diagram illustrating an embodiment of a control device 24, which may represent one or more of the control devices 24A, 24Z of the first and second nodes 12, 14 shown in FIG. 1. The control device 24 may be a local controller for controlling a corresponding optical switching device 18 of a corresponding node 12, 14, or, according to other embodiments, may be a central controller configured to control multiple nodes within an optical communication system. In the illustrated embodiment, the control device 24 may be a digital computer that, in terms of hardware architecture, generally includes a processing device 32, a memory device 34, input/output (I/O) interfaces 36, and an external interface 38. The memory device 34 may include a data store, database, or the like. It should be appreciated by those of ordinary skill in the art that FIG. 3 depicts the control device 24 in a simplified manner, where practical embodiments may include additional components and suitably configured processing logic to support known or conventional operating features that are not described in detail herein. The components (i.e., 32, 34, 36, 38) are communicatively coupled via a local interface 42. The local interface 42 may be, for example, but not limited to, one or more buses or other wired or wireless connections. The local interface 42 may have additional elements, which are omitted for simplicity, such as controllers, buffers, caches, drivers, repeaters, receivers, among other elements, to enable communications. Further, the local interface 42 may include address, control, and/or data connections to enable appropriate communications among the components 32, 34, 36, 38.

The processing device 32 is a hardware device adapted for at least executing software instructions. The processing device 32 may be any custom made or commercially available processor, a central processing unit (CPU), an auxiliary processor among several processors associated with the control device 24, a semiconductor-based microprocessor (in the form of a microchip or chip set), or generally any device for executing software instructions. When the control device 24 is in operation, the processing device 32 may be configured to execute software stored within the memory device 34, to communicate data to and from the memory device 34, and to generally control operations of the control device 24 pursuant to the software instructions.

It will be appreciated that some embodiments of the processing device 32 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 32 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 36 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 36 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The external interface 38 may be used to enable the control device 24 to communicate with the optical switching device 18. The control device 24 may communicate directly with the optical switching device 18 or may communicate over a network, such as the optical communication system 10, the Internet, a wide area network (WAN), a local area network (LAN), and the like. The external interface 38 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The external interface 38 may include address, control, and/or data connections to enable appropriate communications on the optical communication system 10.

The memory device 34 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 34 may incorporate electronic, magnetic, optical, and/or other types of storage media. The memory device 34 may have a distributed architecture, where various components are situated remotely from one another, but can be accessed by the processing device 32. The software in memory device 34 may include one or more software programs, each of which may include an ordered listing of executable instructions for implementing logical functions. The software in the memory device 34 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 34 may include a data store used to store data. In one example, the data store may be located internal to the control device 24 and may include, for example, an internal hard drive connected to the local interface 42 in the control device 24. Additionally, in another embodiment, the data store may be located external to the control device 24 and may include, for example, an external hard drive connected to the I/O interfaces 36 (e.g., SCSI or USB connection). In a further embodiment, the data store may be connected to the control device 24 through a network and may include, for example, a network attached file server.

Moreover, some embodiments may include a non-transitory computer-readable storage medium having computer readable code stored in the memory device 34 for programming the control device 24 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 32 that, in response to such execution, cause the processing device 32 to perform a set of operations, steps, methods, processes, algorithms, functions, techniques, etc. as described herein for the various embodiments.

According to some embodiments, an optical switching module 44 may be configured in the memory device 34 as software or firmware and/or may be configured, at least partially, in hardware in the control device 24. The optical switching module 44 may be stored in a non-transitory computer-readable medium (e.g., the memory device 34) and may include instructions configured to cause the processing device 32 to perform certain functions for switching various aspects of the optical switching devices 18A, 18Z (e.g., the splitter/couplers 28A, 28Z and/or transponders 30A1, 30A2, 30Z1, 30Z2 of the respective optical switching devices 18A, 18Z). The optical switching module 44 may be configured to switch optical components to provide protection (e.g., path protection and/or physical protection) within the nodes. The external interface 38 may be configured to provide control signals (CTRL) to various components for switching input paths to passive optical couplers.

Figure 4A:
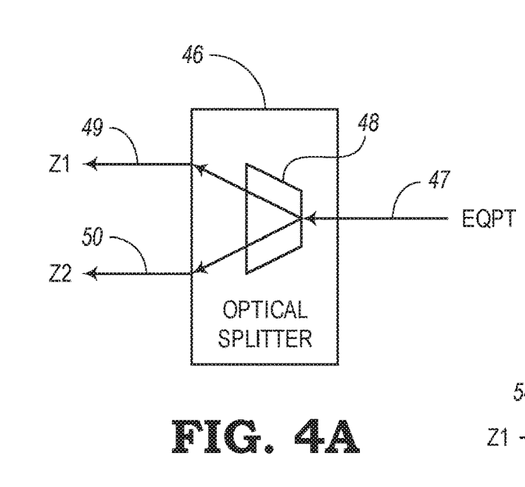
FIG. 4A is a diagram illustrating an optical splitter component of the splitter/coupler shown in FIG. 2B, according to various embodiments.

FIG. 4A is a diagram illustrating an embodiment of an optical splitter 46, which may be part of the splitter/coupler 28Z of Node Z shown in FIG. 2B. The optical splitter 46 may be a passive element and may be used in passive optical protection equipment to bridge traffic from a single source (e.g., the subtending equipment 22Z of Node Z) to two or more transponders (e.g., transponders 30Z1, 30Z2) for carrying the traffic over redundant paths (e.g., paths 20-1, 20-n) through the optical network 16. The optical splitter 46 is configured to split a single optical signal on line 47, using a splitting component 48, into multiple optical signals output along lines 49, 50. The splitting of optical signals by the optical splitter 46 usually does not cause any issues with respect to protection. However, as described below with respect to FIG. 4B and subsequent figures, the action of coupling or combining can become an issue if multiple optical signals are received simultaneously from different sources.

Figure 4B:
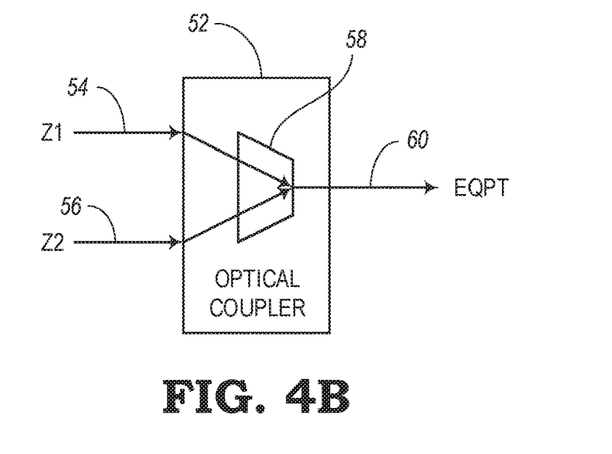
FIG. 4B is a diagram illustrating an optical coupler component of the splitter/coupler shown in FIG. 2B, according to various embodiments.

FIG. 4B is a schematic diagram illustrating an embodiment of an optical coupler 52, which may be part of the splitter/coupler 28Z of Node Z shown in FIG. 2B. The optical coupler 52 may also be a passive element and may be used in passive optical protection equipment to switch traffic coming from redundant transponders (e.g., transponders 30Z1, 30Z2) along paths 54, 56. The traffic is coupled by a combiner component 58 onto an output path 60 leading to a single instance of subtending equipment 22Z. In passive equipment, the optical coupler 52 can combine multiple optical signals into a single signal.

In order for the optical coupler 52 to provide just a single optical signal as output to the subtending equipment 22Z, only a single optical signal can be input into the optical coupler. Otherwise, multiple signals can be received simultaneously, which leads to combined signals interfering with each other and providing too much power that can cause damage to equipment 22Z. The specific switching techniques can therefore be executed by turning off the lasers associated with the transponders 30Z1, 30Z2, sourcing the inputs via paths 54, 56, which, in some cases, are not active optical paths, before turning on lasers from another transponder. This requires coordination between transponders and quick turn-on/turn-off times for the lasers. It should be noted that the optical splitter 46 of FIG. 4A and the optical coupler 52 of FIG. 4B may include the same passive physical components, whereas each is configured to operate in one direction while the other operates in the other direction.

Figure 5A:
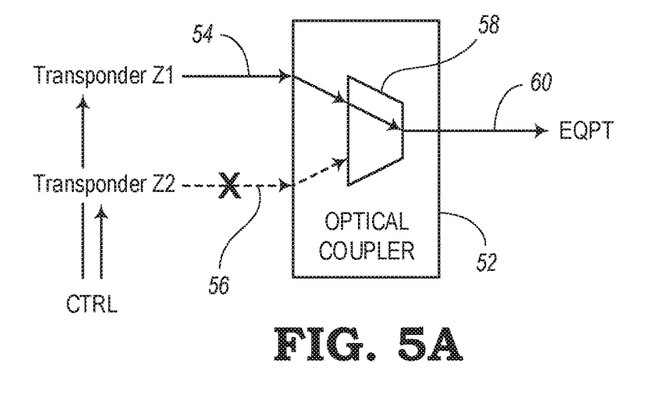
FIGS. 5A-5C are diagrams illustrating different states of a passive optical coupler, according to various embodiments.
Figure 5B:
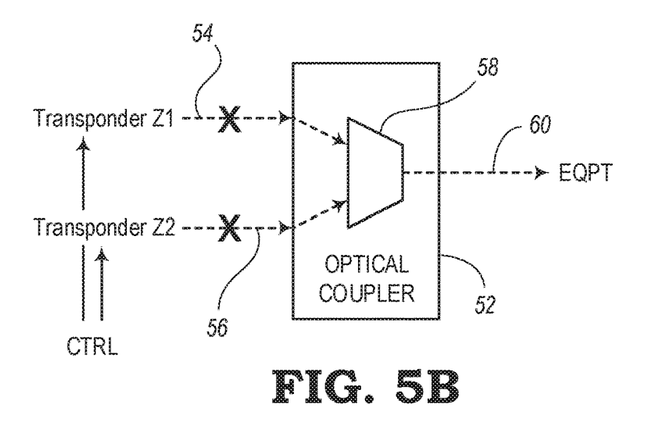
Figure 5C:
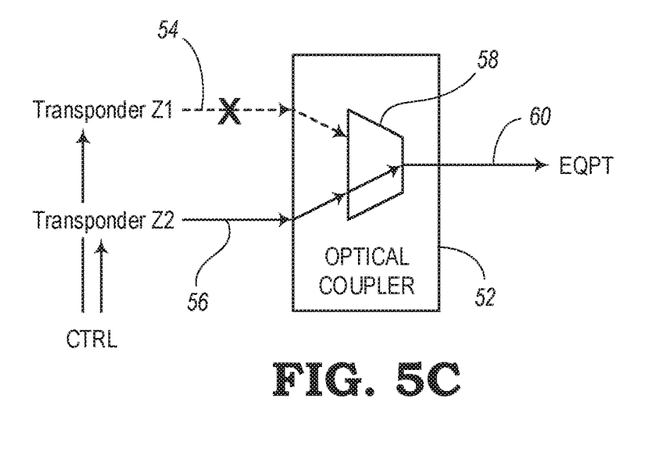

FIGS. 5A-5C are diagrams illustrating examples of different states of the optical coupler 52 of FIG. 4B, implemented as a passive optical coupler. The different states demonstrate how the passive optical coupler 52 is configured to operate as a protection switch. The passive optical coupler 52 include two input paths 54, 56 leading to a passive combining device 58, which provide a single output on an output path 60. In other embodiments, the passive optical coupler 52 may include more than two input paths for receiving optical signals from more than two transponders. For example, the passive combining device 58 may be a Y-cable or other suitable device for receiving optical signals from any number of input paths and providing the optical signals to a single output path. Control signals (CTRL) may be provided to the respective transponders 30Z1, 30Z2, such as from the control device 24, for controlling the switching on and switching off of the lasers of the respective transponders.

FIG. 5A shows a normal state of the optical coupler 52 where one optical path (e.g., input path 54) is carrying the active traffic into the optical coupler 52 (e.g., from the transponder 30Z1). The passive combining device 58 is configured to provide the output optical signal from transponder 30Z1 to the output path 60. Because the passive optical coupler 52 requires only a single optical signal as an input, the second transponder (i.e., transponder 30Z2) in this case will be configured to have its laser output turned off. Thus, no optical signal is received along input path 56.

FIGS. 5B and 5C show a transitional process for transitioning from receiving signals along the first path 54 from the first transponder 30Z1 to receiving signals along the second path 56 from the second transponder 30Z2. FIG. 5B shows what happens when a switch is initiated from one optical path to another. The first step is to turn the active laser (from transponder 30Z1) off, so that no optical signal traverses the input optical path 54. Thus, the passive combining device 58 does not provide any optical signal along the output path 60. This intermediate step of shutting off the active laser is performed before turning another laser on. The reason that the active laser is first turned off is that multiple lasers sourcing optical traffic into the passive coupler will be combined and the resulting optical signal may have enough optical power to damage the receiver in the subtending equipment 22Z. Also, the combined data signal will be mixed in an undesirable fashion.

As shown in FIG. 5C, the completion of the switching process to the new optical path 56 is completed. This includes turning on the laser associated with the transponder Z2 on the newly active optical path 56, while the laser associated with the input path 54 remains off. This sequence of events ensures that only one active optical path traverses the optical coupler 52, and damage is averted to the subtending equipment 22Z at the output path 60 of the optical coupler 52.

Figure 6A:
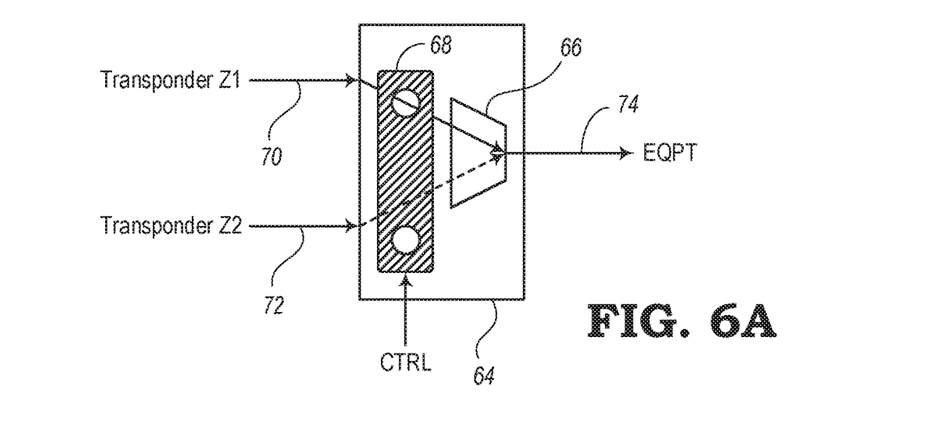
FIGS. 6A-6C are diagrams illustrating different states of an optical coupler having a controllable interrupter, according to various embodiments.
Figure 6B:
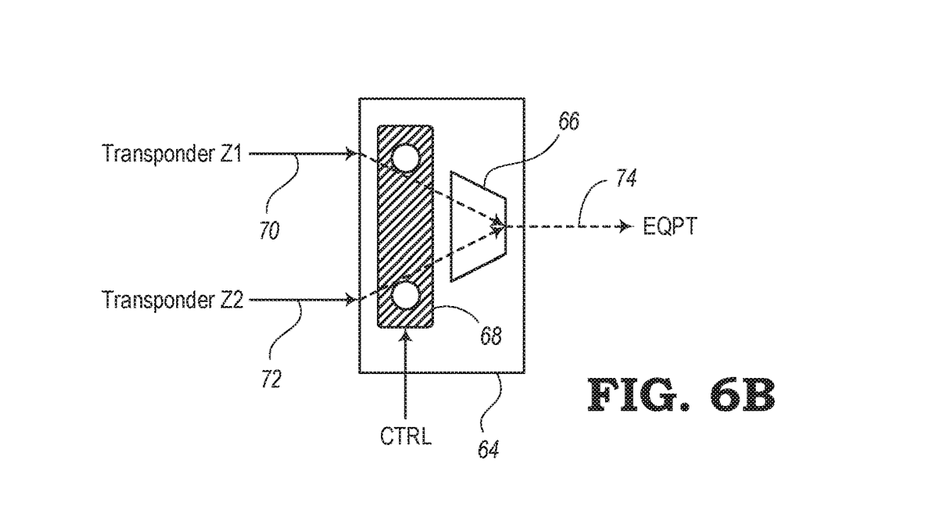
Figure 6C:
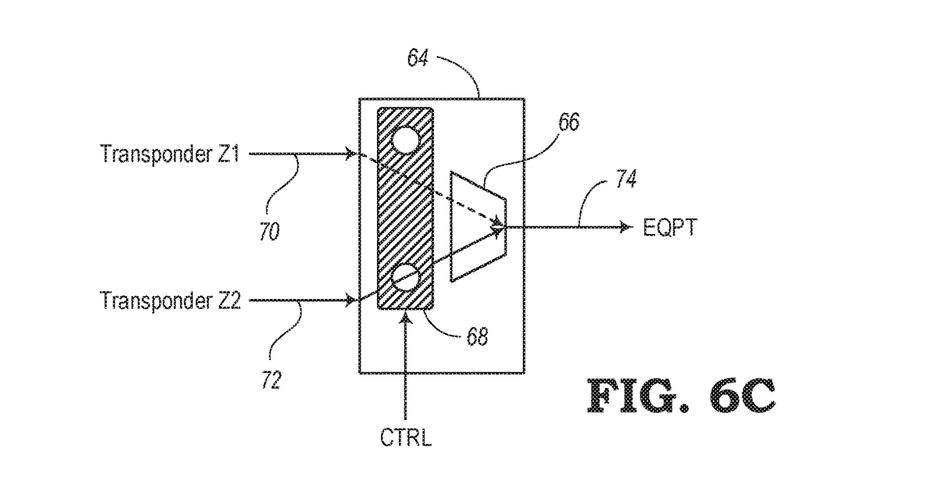

FIGS. 6A-6C are diagrams illustrating an embodiment of an optical protection device 64 and different states of the optical protection device 64 for switching from one input path to another. The optical protection device 64 includes a combining device 66, which may be a passive optical coupler (e.g., Y-cable, 1:2 switch, etc.) or other suitable optical devices. The optical protection device 64 also includes a controllable interrupter 68, which may be controlled, for example, by the control device 24, such as by utilizing the optical switching module 44. Instead of using laser control techniques for controlling the transponders (e.g., transponders 30Z1, 30Z2), as described with respect to FIG. 5, the optical protection device 64 of FIG. 6 utilizes control signals (CTRL) to control the controllable interrupter 68. The control signals CTRL may be provided from the control device 24 or other suitable controlling mechanisms. It should be noted that the interrupter 68 is placed in front of the passive combining device 66 in the receiving direction and is not needed when transmitting and splitting optical signals in the other direction.

It should be realized that FIGS. 6A-6C and the following figures show schematics that are conceptual in nature and are not necessarily representative of actual physical characteristics of various components. Also, the figures may show two transponders for allowing a selection from two paths. The optical splitter/couplers of the present disclosure may be passive Y-cables for selecting from two paths, or, according to other embodiments, may include more than two input paths for receiving from multiple transponders in a 1:N manner (1 protection line for N working lines, N is an integer≥1). In some embodiments, the interrupter 68 may be replaced by one or more optical amplifying/attenuating devices.

Lasers from the corresponding transponders are supplied to two (or more) input paths 70, 72. These lasers can be left on at all times, whereby control is provided to the interrupter 68 to select one of the input paths 70, 72 that is intended to reach the combining device 66. The output of the combining device 66 is supplied to the output path 74. Therefore, with the incorporation of the interrupter 68 in the optical coupling device, the laser turn-on and turn-off times have no impact on the switch processing times.

As shown in FIG. 6A, a normal state is illustrated where one optical path (e.g., input path 70) is active for supplying optical signals into the optical protection device 64. Instead of having one laser on and the remaining lasers off, as is the case in FIGS. 5A-5C, all lasers associated with the corresponding transponders providing optical signals to the paths 70, 70 can remain on, such that optical signals are always received at the input paths 70, 72. However, in the normal state, the interrupter 68 is configured to allow only the input from the path 70 to be supplied to the combining device 66 and is further configured to prevent all other inputs (e.g., from path 72 in this example) from reaching the combining device 66.

FIG. 6B shows an intermediate switching state to illustrate what happens when a primary path (e.g., path 70) is switched to another optical path (e.g., path 72). The interrupter 68 is controlled (e.g., by the control device 24) to interrupt the previously active optical signal (i.e., from path 70) so that no optical signal is able to traverse the optical protection device 64 to the combining device 66. This ensures that there are not multiple lasers sourcing the traffic into the passive coupler, for the same reason as indicated with respect to FIG. 5 to prevent potential damage to the equipment 22Z.

In FIG. 6C, the state of the optical protection device 64 is shown, where the completion of the switching process to the new optical path (i.e., path 72) is complete. In this state, the interrupter 68 is controlled to continue to block optical signals from the primary path 70 and opens a path to allow the newly active optical signal from the backup path 72 to be provided as input through the optical protection device 64 via the combiner device 66. Similar control behaviors can be provided to the interrupter 68 if there were more than two inputs into the optical protection device 64 (i.e., 1:N protection). The single interrupter 68 can be controlled to allow only one input at a time, whereby all other inputs will be blocked. During transition, all inputs are blocked before switching to a new path.

It should be noted that the interrupter 68 shown in FIG. 6 may be conceptual and does not necessarily include any similar physical appearance as such. Instead, FIGS. 6A-6C may simply be an example to illustrate that two inputs 70, 72 are supplied into the optical protection device 64, which provides an output 74 based on the state of the controllable interrupter 68. In this embodiment, the controllable interrupter 68 is a single controllable element that is configured to have an effect on the acceptance of at most one input of two or more inputs. According to other embodiments, similar concepts may be applied when there are multiple inputs into the optical protection device 64 for 1:N protected scenarios.

Figure 7A:
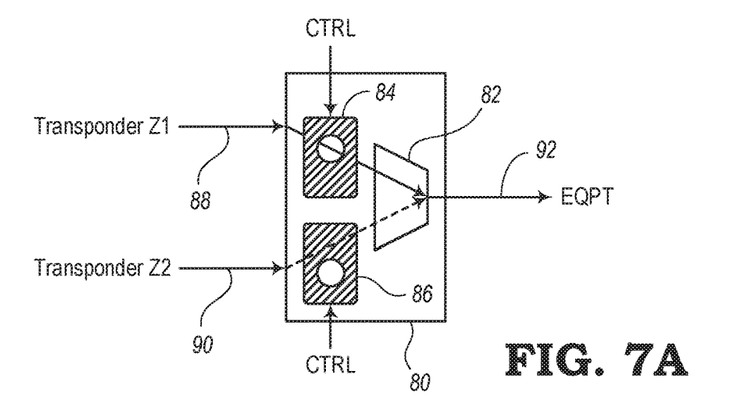
FIGS. 7A-7C are diagrams illustrating different states of an optical coupler having independently controllable interrupters, according to various embodiments.
Figure 7B:
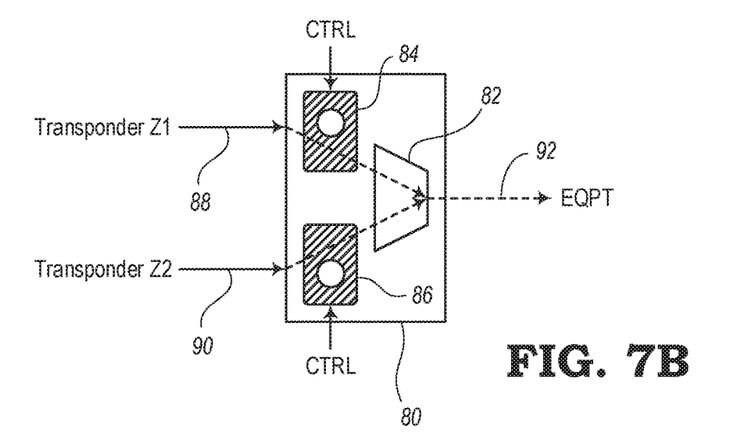
Figure 7C:
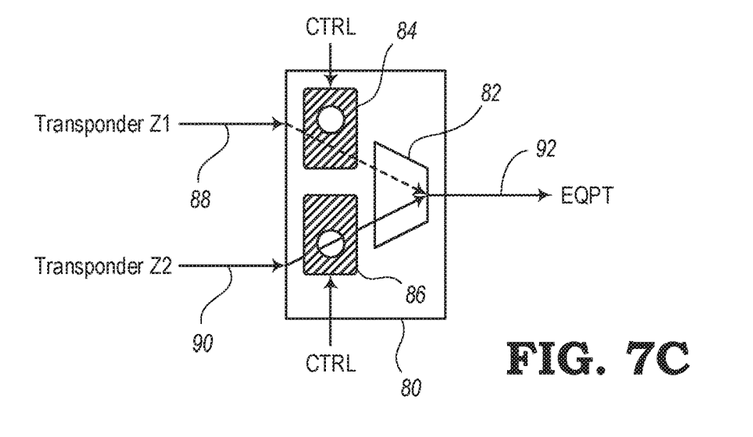

FIGS. 7A-7C are diagrams illustrating an embodiment of another optical protection device 80 and the different states that the optical protection device 80 may experience for switching from one input path to another. The optical protection device 80 of FIG. 7 includes multiple independently controllable interrupters, which differs from the optical protection device 64 of FIG. 6 having only a single interrupter. In this example, the optical protection device 80 is shown with two inputs and two corresponding interrupters. However, according to other embodiments, the optical protection device 80 may have any number of inputs and a corresponding number of independently controllable interrupters.

The optical protection device 80 includes a combining device 82 (e.g., Y-cable or other passive optical components) and independently controllable interrupters 84, 86. The interrupters 84, 86 may be controlled, for example, by the control device 24, such as by utilizing the optical switching module 44, or multiple control devices independently controlling the interrupters 84, 86 in a coordinate manner. Instead of using laser control techniques for controlling the transponders (e.g., transponders 30Z1, 30Z2), as described with respect to FIG. 5, the optical protection device 80 of FIG. 7 uses CTRL signals for controlling the controllable interrupters 84, 86.

Similar to the embodiment of FIG. 6, the optical protection device 80 of FIG. 7 may be configured such that lasers from the corresponding transponders may be supplied to two (or more) input paths 88, 90. These lasers can remain in an "on" state at all times, whereby control is provided to the interrupters 84, 86 to select one of the input paths 88, 90 that is intended to reach the combining device 82. The output of the combining device 82 is supplied to the output path 92.

It should be noted that the interrupters 84, 86 shown in FIG. 7 may be conceptual and do not necessarily include any similar physical appearance as such. Instead, FIGS. 7A-7C may simply be an example to illustrate that two inputs 88, 90 are supplied into the optical protection device 80, which provides an output 92 based on the state of the independently controllable interrupters 84, 86. In this embodiment, the interrupters 84, 86 can be controlled independently of each other so as to affect how inputs 88, 90 are accepted. The interrupters 84, 86 are controlled so that, at most, one input of two or more inputs is received by the passive combining device 82. According to other embodiments, similar concepts may be applied when there are multiple inputs into the optical protection device 80 for 1:N protected scenarios.

The optical protection device 80 of FIGS. 7A-7C illustrates a mechanism where independent interrupters 84, 86 are used for each optical signal. The physical characteristics of the optical protection device 80 are not meant to be limiting, but it should be realized that other arrangements may allow flexibility in the various configurations and implementations that may have similar functionality yet are not specifically depicted in the figures. It should be noted that the interrupters 84, 86 shown in FIG. 7 are conceptual and do not necessarily have any physically resemblance to other embodiments that may be conceived having similar functionality as described herein.

FIG. 7A shows a normal state where one optical path 88 is carrying the active traffic from a first transponder (e.g., transponder 30Z1). The corresponding interrupter 84 for that optical signal is "open" to allow transmission of the optical signal to the combining device 82, while the other interrupter 86 (or all other interrupters in the case where there are more than two inputs and more than two interrupters) is "closed" for blocking these other optical signals to the combining device 82.

In FIG. 7B, the optical protection device 80 is shown in a transitional state when a switch is initiated from the primary path 88 to another optical path 90. The interrupter 84, which was previously open to allow optical signals from input path 88 to pass, is switched such that it interrupts or block the path 88 of the previously active optical signal. At this intermediate stage, no optical signal traverses the optical protection device 80 to the output path 92. This ensures that multiple lasers do not simultaneously source traffic into the passive coupler, which can cause damage to the equipment 22Z, as mentioned above.

FIG. 7C shows the completion of the switching process from the first optical path 88 to the new optical path 90. The interrupter 84 remains in the closed (or blocking) position and the interrupter 86 is subsequently opened (after interrupter 84 has been closed) to allow the newly active optical signal on path 90 to pass. With the interrupter 86 opened (or non-blocking), the optical protection device 80 allows optical signals as be received as input from the second path 90 into the optical protection device 80 and output along path 92.

Independent controls (CTRL) from each of the independent transponders 30Z1, 30Z2 may be provided to the single interrupter 68 shown in FIGS. 6A-6C or may be provided to the multiple independent interrupters 84, 86 shown in FIGS. 7A-7C. In this respect, a controller (e.g., control devices 24, 24A, 24Z, etc.) may be incorporated in the corresponding transponders 30 for providing the CTRL signals. This may allow each transponder 30 (or a separate controller) to control the switching processes completely independently, without the need to coordinate with the other transponders, although coordination is maintained to be able to switch from one path to another in under 50 ms. Also, this allows flexibility in transponder equipment placement and configuration, since they do not necessarily require communication with each other. In other words, the transponders 30 do not need to be located with a direct communication path to the other transponders 30. In some embodiments, the control devices 24 may be external to the optical switching devices 18A, 18Z.

According to some embodiments of the present disclosure, the interrupters 84, 86 shown in FIGS. 7A-7C may be implemented as optical amplifier/attenuator devices operating independently of each other. The amplifying feature of the optical amplifier/attenuator devices in this case may provide the advantage of increasing the power through the optical protection device 80. Since an optical device (e.g., optical protection device 80) will inherently have some level of attenuation (e.g., minimum 3 dB for a passive combiner) therethrough, the amplification of the selected path may overcome the insertion loss to avoid a loss of power that cannot be recovered. In this sense, a client may use any suitable amplifier device in a plug regardless of inherent insertion losses. The optical amplifier/attenuator devices may use Semiconductor Optical Amplifiers (SOAs), Variable Optical Amplifiers (VOAs), or other suitable amplifying elements.

With respect to FIG. 5, it would be beneficial if the associated transponders have fast laser on/off capabilities. However, regarding FIGS. 6 and 7, the transceivers of the transponder equipment no longer needs to have fast laser on/off capabilities since path switching does not rely on switching on or off associated lasers. The transceivers of the transponder equipment could contain multi-lane interfaces, which conventionally cannot be supported in client optical protection applications in all cases because some variants (e.g., QSFP type pluggable transceivers) require individual I2C control to turn off each laser (lane) in the multi-lane interface sequentially.

Figure 8:
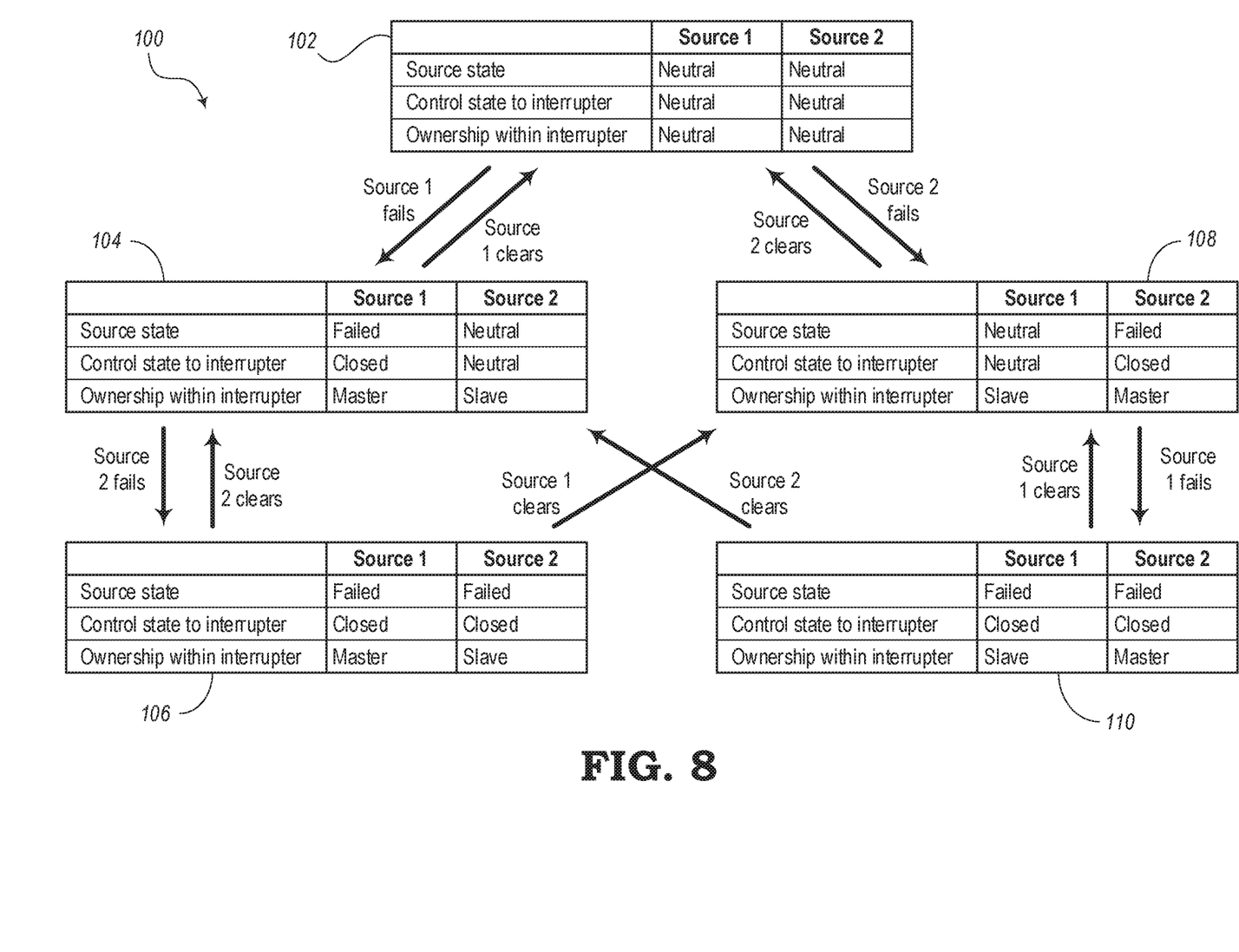
FIG. 8 is a state diagram illustrating various states of the optical coupler of FIG. 6, according to various embodiments.

FIG. 8 is a state diagram 100 illustrating various states of the optical protection device 64 of FIG. 6 having a single interrupter element, which may receive control signals (CTRL) from different controller or transponders. In this case, the single interrupter can be controlled by multiple sources, whereby each source of the multiple sources may be associated with a corresponding transponder. The operation may be independent for each transponder.

In the state diagram 100, "Source 1" refers to signals from a transmitter of transponder Z1, which may represent a primary path along path 70 as illustrated in FIG. 6. "Source 2" may refer to signals from a transmitter of transponder Z2, which may represent a backup path along path 72. The "Source State" represents the state of each of the two sources, and the "Control State to interrupter" represents any control signals provided to the interrupter 68 from the perspective of the transponders corresponding to the respective sources or paths. "Ownership within interrupter" represents which source is given ownership or priority with respect to control of the single interrupter 68.

In the normal state 102 of the state diagram 100, the source state and control state of the sources are all "neutral" and do not care if they are open or closed. At this time, the optical switching device 18 is operating normally according to intended purpose, with no known faults along the various paths. However, if Source 1 (or a corresponding link) fails, the state diagram 100 changes to state 104, which shows that the Source State of Source 1 has "Failed." The Control State for Source 1 in this case is set to "Closed" and Source 1 is given ownership or "Master" status in order to allow it to be forced to the closed state. When the failure of Source 1 clears, then the state diagram moves back to the original, properly-operating state 102. However, if Source 2 also fails when in state 104, the state diagram 100 moves to state 106, which shows both sources failed and both control states closed. Source 1 keeps master control in this case. If Source 2 clears its failure at this point, the state diagram 100 moves back to state 104. However, if Source 1 clears its failure at this point, the state diagram 100 moves to state 108.

State 108 indicates a condition where only Source 2 has a failure. Ownership of interrupter control is given to Source 2 in this case. If Source 2 clears in state 108, the state diagram 100 moves back to the original state 102. However, if Source 1 fails while in state 108, the state diagram 100 moves to state 110. At this state 110, Source 2 keeps the Master control. From state 110, if Source 2 clears, the state diagram 100 moves to state 104. If Source 1 clears, the state diagram 100 moves to state 108.

Depending on the desired complexity and cost to implement, the ownership could represent different levels of priority, rather than just "master" and "slave." Example priorities could be as follows, with the highest priority request "1" taking priority.

Figure 9:
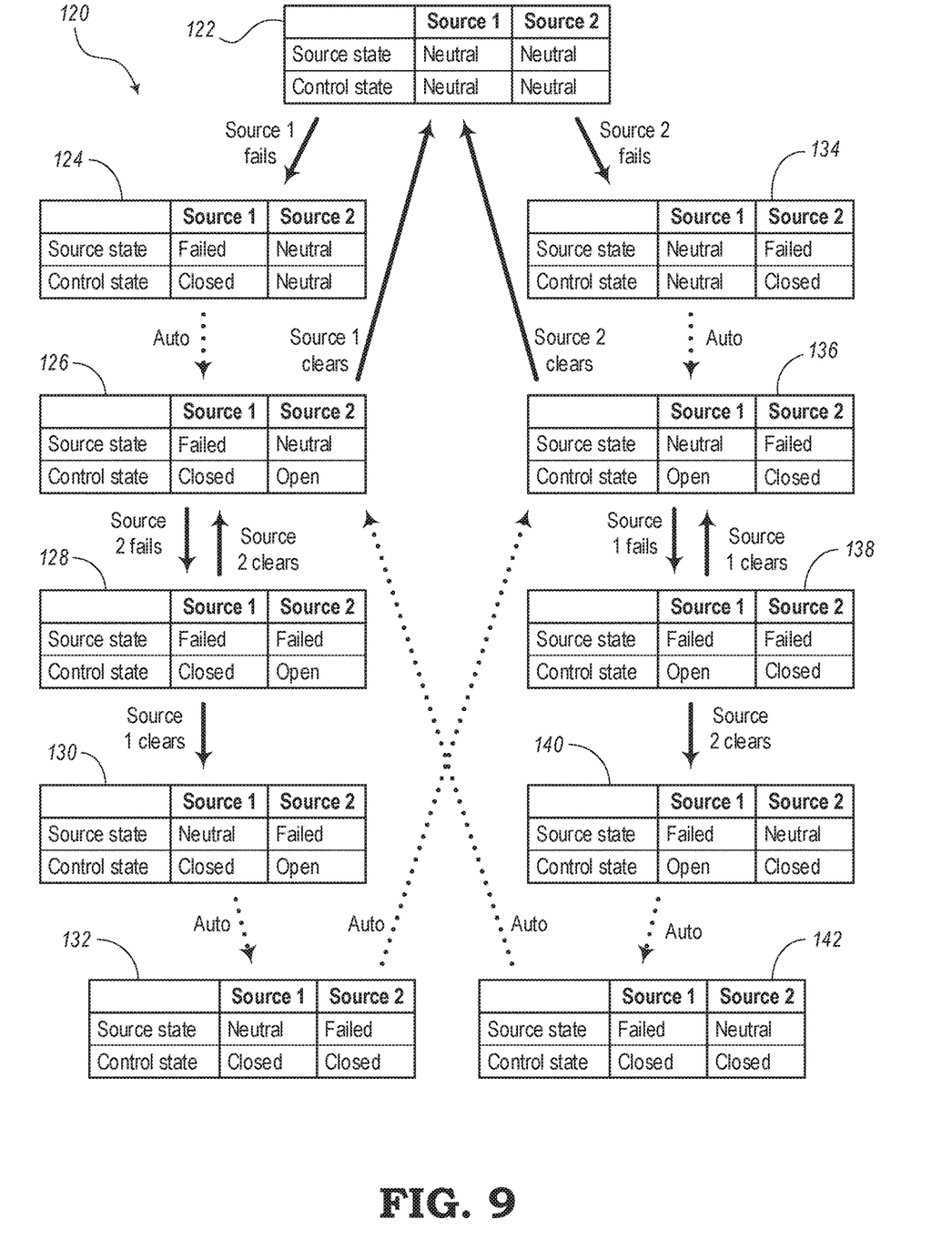
FIG. 9 is a state diagram illustrating various states of the optical coupler of FIG. 7, according to various embodiments.

1=lockout
2=forced switch
3=automatic switch (high priority)
4=automatic switch (low priority) (e.g., degrade as the root cause)
5=manual switch
6=wait to restore FIG. 9 is a state diagram 120 illustrating various states of the optical protection device 80 of FIG. 7 where multiple interrupters can be independently controlled by multiple sources. Since ownership is irrelevant in this case because each interrupter uses one corresponding control device, the "Ownership" state is not needed in the state diagram 120. The state diagram 120 demonstrates coordination to open one interrupter after the other closes. The automatic ("Auto") transitions are shown in the state diagram 120 to provide coordination between the transponders or within the optical coupler equipment itself to ensure that operations are performed in the correct order.

The status reported via Status 1 and Status 2 in this case would align to the Control State being driven by the transponder equipment. State 122 of the state diagram 120 indicates a condition when the optical switching device 18 is operating properly. However, if Source 1 fails, the state diagram 120 moves to state 124 where the "Source State" of Source 1 is indicated as "failed." The "Control State" of Source 1 is this situation is switched to "Closed." After switching the control state of Source 1 to closed, the state diagram automatically advances to state 126, where the Control State of Source 2 is switched to "Open." If Source 1 clears, the state diagram 120 returns to the original state 122.

In state 126, if Source 2 also fails, the state diagram moves to state 128 to indicate the failure of Source 2. The control state of the two sources remains the same at this time. If Source 2 clears, the state diagram 120 returns to state 126. If Source 1 clears, the state diagram 120 moves to state 130 and the Source State of Source 1 is switched to "Neutral." In state 130, after Source 1 has cleared, the state diagram 120 automatically moves to state 132 to set the Control State of Source 2 to "Closed" and then automatically moves to state 136 to set the Control State of Source 1 to "Opened."

From the original state 122, if Source 2 fails, the state diagram 120 moves to state 134 to set the Source State of Source 2 to "Failed" and to set the Control State of Source 2 to "Closed." The state diagram 120 then automatically moves to state 136, which indicates the condition where just the Source 2 is failed. In this state, the Control State of Source 1 is Opened. If Source 2 clears, the state diagram 120 returns to the original state 122. However, if Source 1 fails at this point, the state diagram 120 moves to state 138, which indicates that both Sources are "Failed." If Source 1 clears at this point, the state diagram 120 returns to state 136.

While in state 138, if Source 2 clears, the state diagram 120 moves to state 140 to show the switching of the Source State of Source 2 to "Neutral." Then, the state diagram 120 automatically advances to state 142, where the Control State of Source 1 is switched to Closed, and then automatically advances to state 126, where the Control State of Source 2 is switched to Opened.

Figure 10:
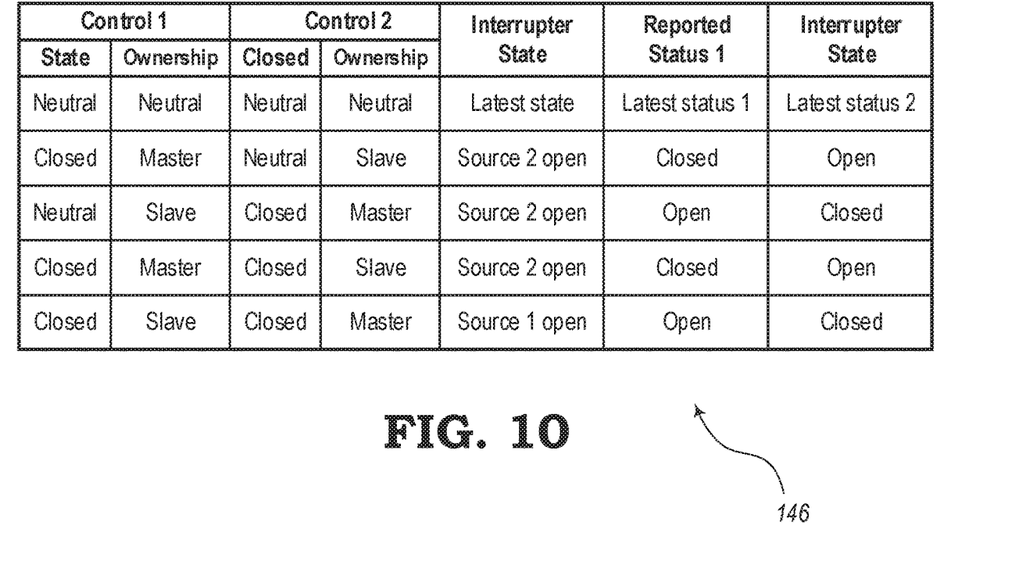
FIG. 10 is a table illustrating the status of the interrupter and the status of the sources, according to various embodiments.

FIG. 10 is a table 146 showing examples of the status of the interrupter and sources (e.g., transponders). The present disclosure may include one or more of the following optical interrupters, in addition to any functionality described elsewhere in the present disclosure:

1) Control for each interrupter:
  If a single interrupter is used for all inputs, the control might specify which input(s) are to be open;
  If individual interrupters are used for each input, the control for each might indicate open or closed, which can be represented by a single bit; and
  If an SOA or other optical amplifier is used, then the control may indicate a level of amplification for the optical signal, or the open state could simply translate to a hard coded amplification level for the device;

2) Status from each interrupter to determine which inputs are opened/closed; and 3) Sufficient electrical power to control and monitor the status of each interrupter.

Control/status and electrical power may be supplied via a backplane if the device is located within the same chassis as other equipment. If the device is not physically contained within the same chassis, it can either have its own power feed or be powered via a cable from some other device (e.g., power over Ethernet). Interrupt control/status in that situation may then be provided via a cable or wireless mechanism to the equipment that is controlling/monitoring the device. If there are multiple interrupters, multiple cables may be used for control/status, if using cables for control/status.

The interrupters could apply to devices with active optical switches, but because these have a switch mechanism, the interrupter may not provide much additional value. The interrupter can be fast enough and provide a clean interruption to the optical signal to minimize the traffic impact during a protection switch. A good guideline for the signal rise/fall time of the interrupter is <2 ms, which is the MSA specification for laser on/off times within pluggable optical transceivers that support a TX_DISABLE pin. QSFP type plugs do not support a TX_DISABLE pin.

Figure 11:
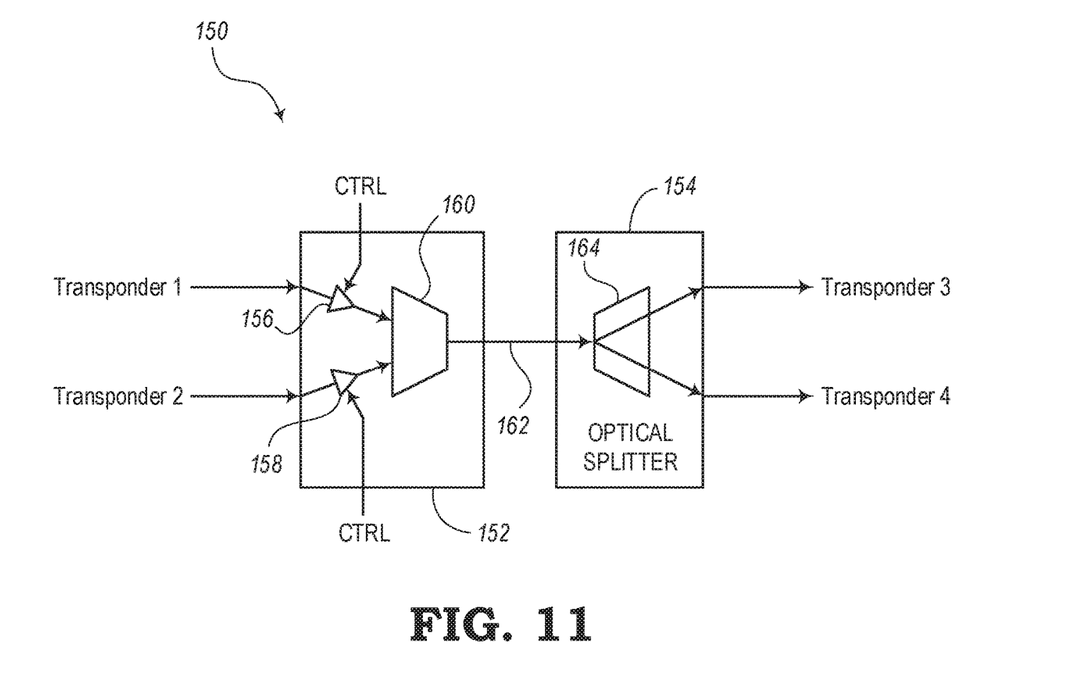
FIG. 11 is a back-to-back (cascaded) optical protection device, according to various embodiments.

FIG. 11 is a block diagram showing an embodiment of a back-to-back (cascaded) optical protection device 150. The optical protection device 150 includes an optical protection device 152 and optical splitter 154 arranged back-to-back. The optical protection device 152 may include a first amplifier 156 and a second amplifier 158, each individually controllable. The amplifiers 156, 158, for example, may be Semiconductor Optical Amplifiers (SOAs) or other suitable type of amplifiers and may be implemented as interrupters. The optical protection device 152 may also include a combining component 160, such as a passive optical coupler (e.g., Y-cable) for combining or coupling the optical signals from a first Transponder and a second Transponder. An output 162 of the optical protection device 152 from the combining component 160 is provided to a splitting component 164 of the optical splitter 154. The optical splitter 164 is configured to split the optical signal into two (or more) outputs, leading to more transponders.

The amplifiers 156, 158 (e.g., SOAs) could be configured to operate as interrupters in accordance with other embodiments described in the present disclosure. A benefit of using an SOA in this example is that if the SOA is not interrupting an optical signal, it could be used to amplify the optical signal through the passive optical device. This would allow the optical switching device to be used in applications where the pluggable optical module does not have sufficient optical link budget to operate with a normal passive optical switching device. Although the pluggable transceivers may be configured with sufficient link budgets to overcome loss through the optical couplers, any type of the pluggable transceivers can be used in the present embodiments, such as, for example, less expensive transceivers having low link budgets. Conventionally, these transceivers cannot be used in client optical protection applications because the optical protection equipment introduces too much loss on the optical signal.

In addition, the embodiments of the present disclosure allow for additional pluggable transceiver types to be supported in cascaded (back-to-back) client optical protection schemes, which incur excess insertion loss due to back-to-back optical components. FIG. 11 shows the equipment involved in a site where back-to-back client optical protection exists. Insertion losses would be incurred within the optical coupler, as well as within the optical splitter that exists between transponders 1 or 2 and transponders 3 or 4.

The transponder equipment may not require direct communication paths between them, which is currently used in conventional systems to coordinate laser activity. Therefore, the present embodiments allow flexibility in slot/card configurations. Also, this would meet a less than 50 ms protection switch time for passive optical path protection, regardless of the transceiver types and capabilities, which is typically an issue for plugs operating at 40 Gb/s or faster.

According to the systems and methods described in the present disclosure, the following may include some of the operating principles of the embodiments:

1—Instead of turning lasers on/off to trigger client-side optical protection, many of the embodiments use built-in interrupters on the optical protection equipment to control the light, regardless of transceiver capabilities. This allows any transceivers to be used on the transponder client ports, and the laser off/on capabilities of the transceiver are not important. This also permits cheaper devices to be able to be used, offering another way to lower the overall solution cost.

2—If a single interrupter is used, with controls from each transponder equipment, each instance of transponder equipment can control the interrupter independent of the other as shown in FIG. 8. No direct communications path is required between transponder equipment, so slot assignments are independent (and thus flexible). If multiple interrupters are used, coordination across the coupler inputs is still required. This logic may be able to be built into the optical coupler equipment, which could mean that no direct communications path is required between transponder equipment.

3—If a single interrupter is used, with controls from each transponder equipment, coordination between transponders is not required, resulting in less processing by each transponder, and lower traffic impacts due to the protection switch. If multiple interrupters are used but the coordination logic is performed within the optical coupler equipment, this may also result in less processing by each transponder, and lower traffic impacts due to the protection switch.

4—Overcoming the need for co-located equipment also allows protection of services across mated configurations where a single OTUCn line consists of optical ports on two adjacent circuit packs.

5—Overcoming the need for co-located equipment also allows protection between circuit packs across different shelves.

6—This invention adds value to passive optical coupler devices, which are cheaper than active optical switches.

7—This invention interrupts the entire optical signal in one operation, so individual controls are not required for each lane within a multi-lane pluggable transceiver and we can easier meet the 50 ms requirement for protection switch times.

8—Adding a SOA or other amplifier into the device allows amplification of the optical signal to increase the link budget, thus enable virtually any pluggable transceiver to be used in these applications. SOAs are cheaper than normal optical amplifiers such as EDFAs.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A protection device comprising:
a passive optical coupler configured to combine optical signals from a plurality of input paths, the passive optical coupler further configured to provide the optical signals along an optical output path; and
one or more interrupters configured to allow at most one input from a plurality of optical inputs via the plurality of input paths to be provided to the passive optical coupler at one time.

2. The protection device of claim 1, wherein the one or more interrupters include a single interrupting device configured to interrupt all optical inputs.

3. The protection device of claim 2, wherein, during a switching process for switching from a first input path to a second input path, the single interrupting device is configured to interrupt optical signals via the first input path before allowing optical signals via the second input path.

4. The protection device of claim 2, wherein the single interrupting device is controlled by one or more control signals from one or more control devices.

5. The protection device of claim 4, wherein each of the one or more control devices is associated with a respective transponder.

6. The protection device of claim 1, wherein the one or more interrupters includes a plurality of independent interrupters, and wherein each independent interrupter is associated with a respective transponder.

7. The protection device of claim 6, wherein, during a switching process for switching from a first input path to a second input path, a first independent interrupter is configured to interrupt optical signals via the first input path before a second independent interrupter allows optical signals to pass via the second input path.

8. The protection device of claim 6, wherein each of the plurality of independent interrupters includes an optical amplifier/attenuator device.

9. The protection device of claim 1, wherein an open/closed state of the one or more interrupters is based on failure conditions of the plurality of optical inputs.

10. An optical switching device comprising:
a plurality of optical input paths configured for receiving optical signals via an optical network;
a passive optical coupler configured to combine optical signals from the plurality of optical input paths, the passive optical coupler further configured to provide output signals along an optical output path; and
one or more interrupters configured to allow at most one input from the plurality of optical input paths to be provided to the passive optical coupler at one time.

11. The optical switching device of claim 10, wherein the one or more interrupters include a single interrupting device configured to interrupt all optical inputs.

12. The optical switching device of claim 11, wherein, during a switching process for switching from a first input path to a second input path, the single interrupting device is configured to interrupt optical signals via the first input path before allowing optical signals via the second input path.

13. The optical switching device of claim 11, wherein the single interrupting device is controlled by one or more control signals from one or more control devices.

14. The optical switching device of claim 13, wherein each of the one or more control devices is associated with a respective transponder.

15. The optical switching device of claim 10, wherein the one or more interrupters includes a plurality of independent interrupters, and wherein each independent interrupter is associated with a respective transponder.

16. The optical switching device of claim 15, wherein, during a switching process for switching from a first input path to a second input path, a first independent interrupter is configured to interrupt optical signals via the first input path before a second independent interrupter allows optical signals to pass via the second input path.

17. The optical switching device of claim 15, wherein each of the plurality of independent interrupters includes an optical amplifier/attenuator device.

18. The optical switching device of claim 10, wherein an open/closed state of the one or more interrupters is based on failure conditions of the optical input paths.

19. A non-transitory computer-readable medium configured to store computer logic having instructions that, when executed, cause one or more processing devices to:
- control one or more interrupters of an optical switching device to block optical signals to a passive optical coupler via a primary input path from a first optical source; and
- subsequent to blocking the optical signals via the primary input path, control the one or more interrupters of the optical switching device to allow optical signals to pass to the passive optical coupler via a second input path from a second optical source;
- wherein optical signals from at most one input path are provided to the passive optical coupler at one time.

20. The non-transitory computer-readable medium of claim 19, wherein the one or more interrupters include one or more optical amplifier/attenuator devices.

* * * * *